(12) United States Patent
Xu et al.

(10) Patent No.: US 10,971,012 B2
(45) Date of Patent: Apr. 6, 2021

(54) DUAL MODE INDOOR PARKING DATA DELIVERY AND MAP INTEGRATION

(71) Applicant: HERE Global B.V., Eindhoven (NL)

(72) Inventors: Jingwei Xu, Buffalo Grove, IL (US); Yuxin Guan, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 4 days.

(21) Appl. No.: 16/256,450

(22) Filed: Jan. 24, 2019

(65) Prior Publication Data
US 2020/0242934 A1 Jul. 30, 2020

(51) Int. Cl.
G08G 1/14 (2006.01)
G06K 9/00 (2006.01)
G01C 21/36 (2006.01)

(52) U.S. Cl.
CPC ......... G08G 1/144 (2013.01); G01C 21/3685 (2013.01); G06K 9/00812 (2013.01)

(58) Field of Classification Search
CPC ........ G08G 1/144; G08G 1/141; G08G 1/146; G01C 21/3685
See application file for complete search history.

(56) References Cited

U.S. PATENT DOCUMENTS

| 6,147,624 | A * | 11/2000 | Clapper | ........ G08G 1/14 340/932.2 |
| 7,899,583 | B2 * | 3/2011 | Mendelson | ....... G07F 17/246 701/1 |
| 9,035,799 | B2 | 5/2015 | Love | |
| 9,121,931 | B2 | 9/2015 | Xu et al. | |
| 9,976,860 | B2 | 5/2018 | Varoglu et al. | |
| 2004/0012481 | A1 * | 1/2004 | Brusseaux | ....... E04H 6/42 340/5.7 |
| 2010/0085214 | A1 * | 4/2010 | Kim | ........ G08G 1/14 340/932.2 |

(Continued)

FOREIGN PATENT DOCUMENTS

CN 104851318 A 8/2015
JP 2007280073 A 10/2007
(Continued)

OTHER PUBLICATIONS

C.W Hsu, et al. "Verification of INS/vehicular Technology in Parking Garage Service Using Dsrc and Mobile Communication." The 11th International Conference on Automation Technology, Douliou, Yunlin, Taiwan, (2011): pp. 1-6.

*Primary Examiner* — Emily C Terrell
(74) *Attorney, Agent, or Firm* — Lempia Summerfield Katz LLC

(57) ABSTRACT

An apparatus and method for vehicle parking navigation and communication is described. Between a mobile device and a parking server, a first communication link is established. First parking data is received over the first communication link. A parking request including a parking facility identifier is received and a short range communication network is identified, at least in part in response to the parking facility identifier. Between the mobile device and the parking server, a second communication link is established for the short range communication network. Second parking data is received over the second communication link. The first parking data and second parking data may be combined.

19 Claims, 13 Drawing Sheets

(56) References Cited

U.S. PATENT DOCUMENTS

| | | | |
|---|---|---|---|
| 2013/0103200 A1* | 4/2013 | Tucker | G01C 21/20 |
| | | | 700/275 |
| 2014/0309924 A1* | 10/2014 | Varoglu | G01C 21/206 |
| | | | 701/410 |
| 2014/0335897 A1* | 11/2014 | Clem | G08G 1/147 |
| | | | 455/456.3 |
| 2016/0047672 A1* | 2/2016 | Sachdev | G01C 21/3423 |
| | | | 701/438 |
| 2016/0187143 A1* | 6/2016 | Colby | G01C 21/26 |
| | | | 701/532 |
| 2017/0212511 A1 | 7/2017 | Paiva Ferreira et al. | |
| 2018/0045535 A1 | 2/2018 | Kim et al. | |
| 2020/0192351 A1* | 6/2020 | Rastoll | G05D 1/0038 |

FOREIGN PATENT DOCUMENTS

| | | | |
|---|---|---|---|
| JP | 2010002347 A | 1/2010 | |
| JP | 2013171417 A | 9/2013 | |

* cited by examiner

DUAL MODE INDOOR PARKING DATA DELIVERY AND MAP INTEGRATION

FIELD

The following disclosure relates to navigation devices and services, and more specifically, to systems, apparatus and methods for obtaining vehicle parking navigation and map information.

BACKGROUND

In recent years, an increasing number of automotive manufacturing and other companies are investing enormous amount of resources and investment into the research and development of autonomous driving vehicles. Some companies are already conducting field testing of their new autonomous technologies. It is expected that there will be millions of autonomous driving vehicles on the road soon. Though all these new technology developments will bring benefits from a technical perspective, it will also introduce challenges for automated parking in cities and rural areas in a mixed driving environment. The challenge for automated parking will be especially noticeable in places such as underground parking garages where GNSS (Global Navigation Satellite System) technology has difficulties to provide positioning services. Therefore, current parking systems cannot provide indoor map information and navigation service within an indoor parking garage.

SUMMARY

In one embodiment, a method for vehicle parking navigation and communication including negotiating a first communication link between a mobile device and a parking server, receiving first parking data over the first communication link, receiving a parking request including a parking facility identifier, identifying a short range communication network at least in part in response to the parking facility identifier, negotiating a second communication link between the mobile device and the parking server, wherein the short range communication network includes the second communication link, receiving second parking data over the second communication link, and merging the first parking data and second parking data.

In another embodiment, an apparatus for vehicle parking navigation and communication including a parking venue selector, a long range communication module, a short range communication module, and a marking message module. The parking venue selector is configured to receive a parking request and determine a parking facility identifier in response to the parking request. The long range communication module is configured to negotiate a first communication link with a parking server and receive first parking data over the first communication link. The short range communication module is configured to negotiate a second communication link with the parking server in response to the parking facility identifier and receive second parking data over the second communication link. The parking message module configured to merge the first parking data received over the first communication link and the second parking data received over the second communication link into a parking message.

In another embodiment, a non-transitory computer readable medium including instructions that when executed by a processor are configured to perform identifying first parking data describing a parking venue, receiving position data associated with a plurality of vehicles in the parking venue, performing an indoor positioning algorithm for locations the plurality of vehicles, generating second parking data including the location of at least one of the plurality of vehicles, providing the first parking data via a first communication link to a mobile device, and providing the second parking data via a second communication link to a mobile device.

BRIEF DESCRIPTION OF THE DRAWINGS

Several embodiments of the present invention are described herein with reference to the following drawings.

DETAILED DESCRIPTION

Figure 1:
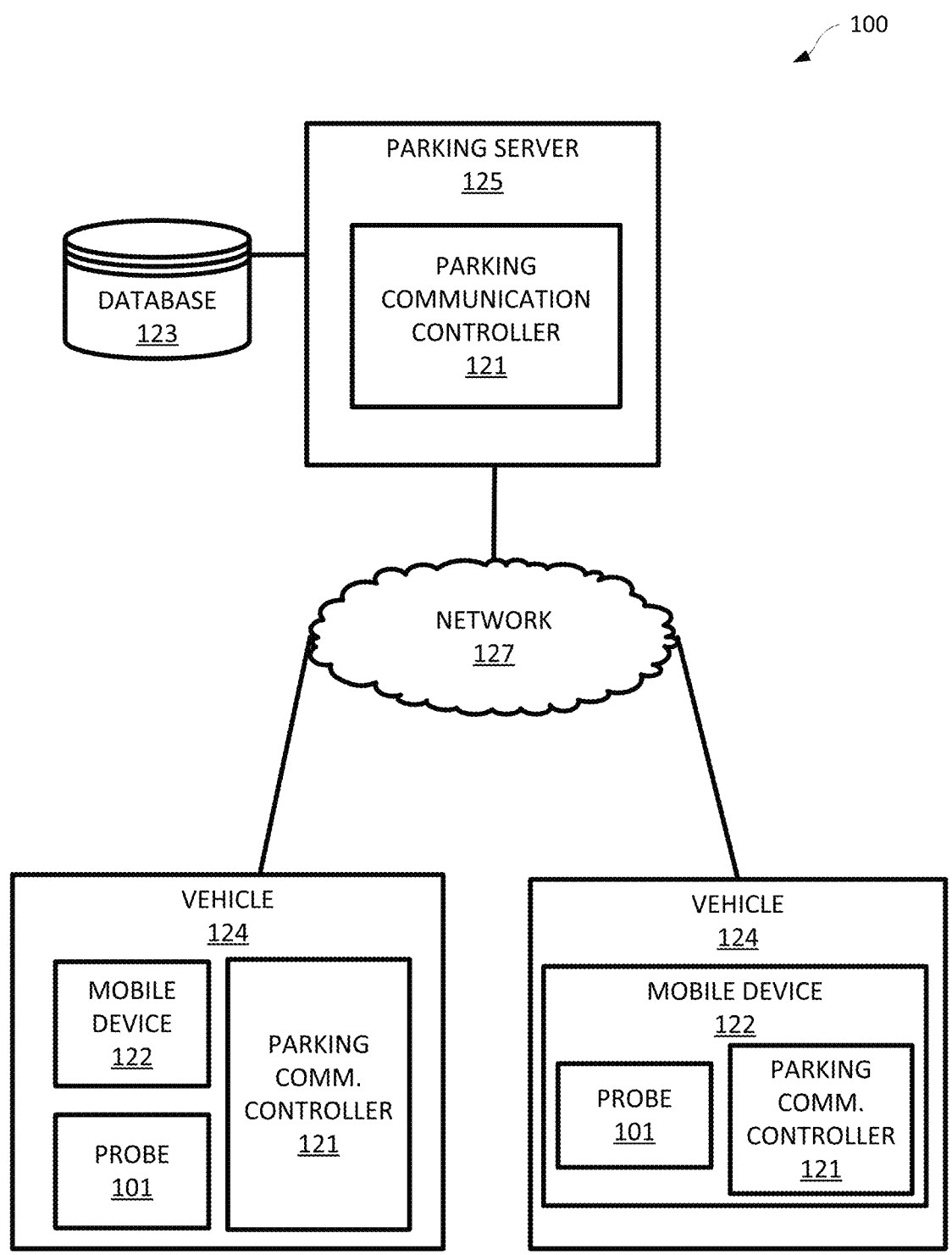
FIG. 1 illustrates an example system for vehicle parking navigation and communication.

Parking systems provide indoor map information and navigation service within a parking facility, which may be an indoor parking garage or a partially covered parking structure. On the communication side, some vehicles may be equipped with cellular modems to communicate with the cellular network to obtain the map and parking dynamic information. Vehicles not equipped with cellular modem devices are incapable of receiving real time map data and dynamic parking data over the air communication. Additionally, in some parking areas, for example in many sightseeing places, cellular tower constructions are prohibited by regulation or other reasons.

Especially in places such as underground parking or covered parking where GNSS technology has difficulties to provide the positioning services, another type of positioning may be used. For example, an alternative positioning approach may utilize beacon technology such as Wi-Fi, small cell, infrared sensors, or loop sensors. Another approach may include a camera or lighting technology for accurate indoor positioning service.

The present disclosure includes a combination of dedicated short-range communications (DSRC) and cellular network technologies to support the indoor parking communications. DSRC operate in a wireless communication channel. The wireless communication channel may operate in the 5.9 GHz band with allocated 75 MHz of spectrum for use by the Intelligent Transportations Systems (ITS) to provide vehicle safety and mobility applications. As its name indicates, DSRC mainly provides from hundreds of meters up to 1 km of distance communication. Unlike cellular networks, DSRC has capabilities of broadcasting the information to all vehicles in its communication range.

Embodiments described herein relate to systems and methods for vehicle parking navigation and communication. The systems and methods disclosed herein may be used by map companies to work with parking service providers to deliver dynamic parking data through cellular data which then can be further seamlessly integrated into online or offline static map data in rendering a specific map layer. For example, one map layer may include road segments and nodes, another map layer may include point-of-interest information, and a third layer may include parking data. The systems and methods disclosed herein may integrate dynamic parking data into the layer for parking data.

The disclosed systems and methods may enable map service provider companies to take advantage of technology such as DSRC and may integrate the indoor positioning technology into venue map products. Provider companies may further deliver map information to end customers for navigation or other purposes. The data may be delivered through the over the air communication channel like cellular technology (3G/4G/5G) or other wireless communication technology such as DSRC in broadcasting mode.

The systems and methods disclosed herein may also deliver parking data through DSRC or other technology in broadcasting mode at the parking entrance gate. The disclosed systems and methods may enable vehicles equipped with a DSRC receiver to receive such broadcasting information even when no cellular data is available. The DSRC may server as a backup for cellular link in case the first communication link is unavailable or not equipped with mobile device.

The disclosed systems and methods may allow the map services inside the vehicle to have the flexibility of using multiple options to process the broadcasting parking data. For example, the vehicle may continue to receive the dynamic parking data if the vehicle is already equipped with a cellular modem. Otherwise, the vehicle may receive the parking data and render it as an indoor parking image for the display. Alternatively, the vehicle may receive the parking data and render it as text message to be used in the vehicle display.

FIG. 1 illustrates an example system 100 for vehicle parking navigation and communication. The system 100 includes one or more server(s) 125, e.g., a parking server. The server 125 may include a parking communication controller 121. The system 100 may further include a mobile device 122 and a network 127. A developer system may include the server 125 and a database 123. The database 123 may be a geographic database or map database. The developer system may include computer systems and networks of a navigation system operator. The mobile device 122, or multiple mobile devices, collects the probe data and the server 125 performs the following algorithms on the probe data. Alternatively, the mobile device 122 may perform the algorithms on the probe data. The vehicles 124 may be directly connected to the server 125 or through an associated mobile device 122. The server 125 and the geographic database 123, exchanges (e.g., receives and sends) data from the vehicles 124. Additional, different, or fewer components may be included.

The server 125 may be a host for a website or web service such as a mapping service and/or a navigation service. The mapping service may provide maps generated from the geographic data of the database 123, and the navigation service may generate routing or other directions from the geographic data of the database 123. The mapping service may also provide information generated from attribute data included in the database 123. The server 125 may also provide historical, future, recent or current traffic conditions for the links, segments, paths, or routes using historical, recent, or real time collected data. The server 125 may be configured to generate a route to a parking area that is within a distance of a destination that is predicted to have at least one open parking spot. The mapping service may further provide parking maps generated from the indoor map data and the dynamic parking data of the database 123. The navigation service may further generate routing or other directions to an available parking spot.

The mobile devices 122 may be a smartphone or other computer device including an internal probe 101 and one or more control devices such as parking communication controller 121. Alternatively, these components may be integrated with the vehicle 124. For example, the mobile device 122 may be a navigation system (e.g., in-dash computer system) that is coupled with an external probe 101 of the vehicle 122 and one or more control device such as parking communication controller 121.

The system 100 may communicate with the mobile devices 122 through the network 127. The system 121 may also receive data from one or more systems or services that may be used to identify historical parking availability. The devices 122 may be a mobile device or a tracking device that provides samples of data for the location of a person or vehicle. The devices 122 may include mobile phones running specialized applications that collect location data as the devices 122 are carried by persons or things traveling the roadway system. The mobile devices 122 may also be integrated in or with a vehicle. The mobile devices 122 may be configured to collect and transmit data including when a vehicle is parked. The mobile device 122 may be configured to present a route to one or more parking areas. The mobile devices 122 may be configured to present levels of parking availability to a user or vehicle.

The mobile device 122 may include mapping applications, or navigational applications which utilize the vehicle parking and communication system 100. The parking map application may display indoor elements when the mobile device 122 has transitioned to an indoor location. The mapping application may seamlessly integrate the dynamic parking data with static map data. Additionally, the mapping application may integrate or render the data separately as an image or as a text service displayed on the mobile device 122 otherwise displayed to the vehicle or driver.

The mobile devices 122 may include local databases corresponding to a local map, which may be modified by the server 125 using the geographic database 123. The local map may include a subset of the geographic database 123 and is updated or changed as the vehicles 124 travel. In some embodiments the local maps are modified according to data collected by the mobile device 122 or vehicle 124. In other embodiments, the collected data is transferred to the server 125 for augmenting the geographic database 123.

Each vehicle 124 and/or mobile device 122 may include position circuitry (e.g., probe 101) such as one or more processors or circuits for generating probe data. The probe data may be generated by receiving GNSS signals and comparing the GNSS signals to a clock to determine the absolute or relative position of the vehicle 124 and/or mobile device 122. The probe data may be generated by receiving radio signals or wireless signals (e.g., cellular signals, the family of protocols known as WiFi or IEEE 802.11, the family of protocols known as Bluetooth, or another protocol) and comparing the signals to a pre-stored pattern of signals (e.g., radio map). The mobile device 122 may act as probe 101 for determining the position or the mobile device 122 and the probe 101 may be separate devices.

The probe data may include a geographic location such as a longitude value and a latitude value. In addition, the probe data may include a height or altitude. The probe data may be collected over time and include timestamps. In some examples, the probe data is collected at a predetermined time interval (e.g., every second, ever 100 milliseconds, or another interval). In some examples, the probe data is collected in response to movement by the probe 101 (i.e., the probe reports location information when the probe 101 moves a threshold distance). The predetermined time interval for generating the probe data may be specified by an application or by the user. The interval for providing the probe data from the mobile device 122 to the server 125 may be may the same or different than the interval for collecting the probe data. The interval may be specified by an application or by the user.

Communication between the vehicles 124 and/or between the mobile device 122 and the server 125 through the network 127 may use a variety of types of wireless networks. The communication may include long range communication such as cellular technologies, which may be analog advanced mobile phone system (AMPS), the global system for mobile communication (GSM), third generation partnership project (3GPP), code division multiple access (CDMA), personal handy-phone system (PHS), and 4G or long term evolution (LTE) standards, 5G, or another protocol. The communication may include a short range communication such as DSRC (dedicated short range communication) or wireless networks such as the family of protocols known as WiFi or IEEE 802.11, the family of protocols known as Bluetooth, or another protocol.

The parking communication controller 121 manages the communication between the server 125 and the mobile device 122 for the purpose of navigation to a parking facility and/or parking space within a parking facility. In some embodiments, the parking communication controller 121 is implemented by the server 125 and in other embodiments, the parking communication controller 121 is implemented by the mobile device 122. In some examples, aspects are performed by both the server 125 and the mobile device 122.

The parking communication controller 121 may establish communication with the mobile device 122 according to the capabilities of the mobile device 122. Some vehicles may be configured for long range communication, some vehicles may be configured for short range communication, and some vehicles may be configured for both short and long range communication.

The server 125 may provide portions of parking data through short range communication and other portions of parking data through long range communication. In one example, routing to a parking facility is provided through long range communication and/or venue maps illustrating the layout of the parking facility are provided through long range communication. However, capacity information and/or routing to an individual parking space is provided through short range communication. In other examples, capacity information (e.g., whether or not spaces are available in a parking facility) are provided via the long range communication. In response to availability, routing is provided to the parking facility. When the vehicle 124 arrives at the parking facility, venue maps and/or updated availability information is provided through the short range communication.

Figure 2:
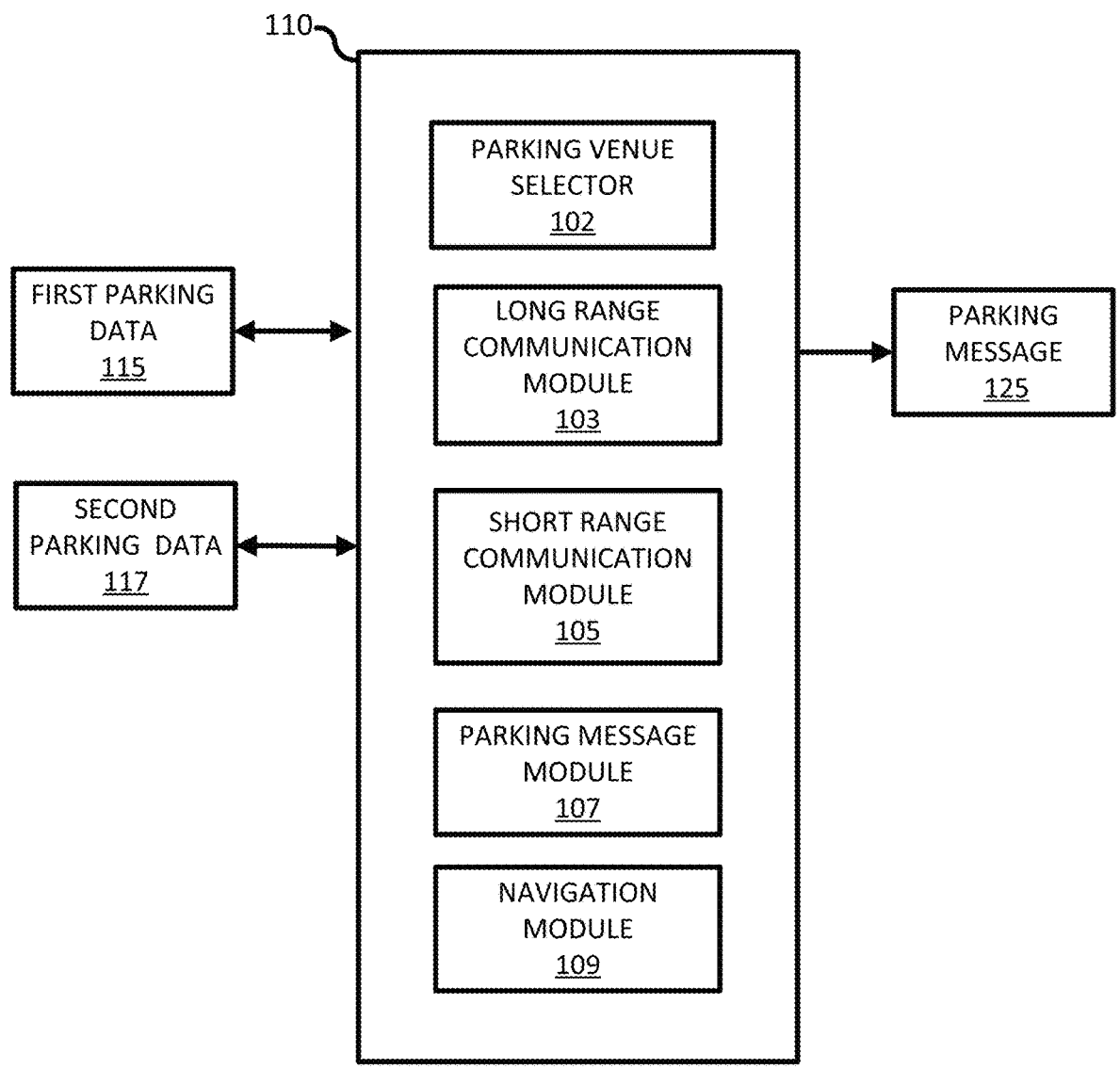
FIG. 2 illustrates an example framework for the parking venue controller of the system of FIG. 1.

FIG. 2 illustrates an example framework for implementing the parking navigation and communication system. The parking navigation and communication system may include a controller 110 including any combination of a parking venue selector 102, a long range communication module 103, a short range communication module 105, a parking message module 107, and a navigation module 109. The controller 110 may be implemented by either the mobile device 122 or the server 125. In some examples, portions of the framework in FIG. 2 may be implemented by the server 125 and other portions may be implemented by the mobile device 122. Additional, different, or fewer components may be included.

The parking venue selector 102 may receive one or more parking requests. The parking request may include data indicative of the geographic coordinates requested for parking. The parking request may include data indicative of the type of car requesting the parking (e.g., compact, full size, van, handicap, or another type). When implemented by the server 125, the parking requests are received from the mobile device 122. When implemented by the mobile device 122, the parking requests are received from a user input. For example, the user may input an instruction to locate a parking facility, which may be the nearest parking facility to a current location as determined by the probe 101, the nearest parking facility to a destination, or the nearest parking facility to a route. Rather than location and the nearest parking facility, the parking facility may be selected according to cost or availability. The parking venue selector 102 may then determine a parking facility identifier in response to the parking request. For example, the parking venue selector 102 may query a table of parking facilities according to geographic coordinates determined by the parking request.

The long range communication module 103 may negotiate a first communication link between the mobile device 122 and the server 125. The long range communication module 103 may receive first parking data over the first communication link. The short range communication module 105 may negotiate a second communication link between the mobile device 122 and the server 125 and receive second parking data over the second communication link. The second communication link may be initiated or negotiated in response to the response to the parking facility identifier from the parking request.

For example, after the parking venue selector 102 may query a table of parking facilities according to geographic coordinates determined by the parking request, a parking facility may be associated with a specific short range network. The parking venue selector 102 may identify a target network identifier for the short range communication network from the parking facility table. As a vehicle approaches the DSRC gateway 133, a communication signal from the short range communication network is received. The communication signal is analyzed to identify a broadcasted network identifier from the communication signal. The parking venue selector 102 performs a comparison of the target network identifier to the broadcasted network identifier.

Alternatively, the parking venue selector 102 may receive position data from the mobile device 122. The parking venue selector 102 may further identify the short range communication network at least in part in response to the position data. The parking venue selector 102 may perform a comparison between the position data and the parking request and determine whether to negotiate the second communication link in response to the comparison.

Figure 3:
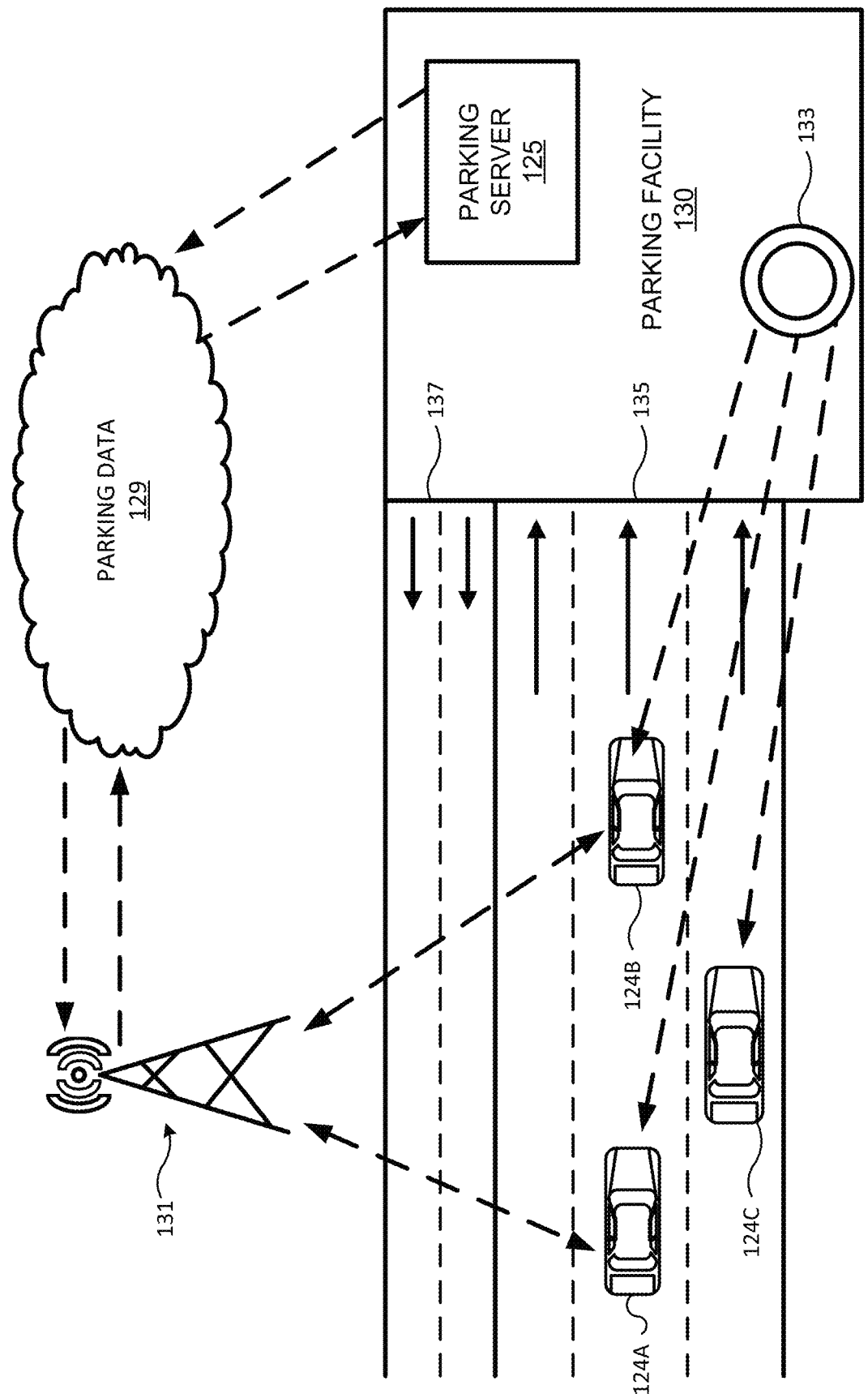
FIG. 3 illustrates an example system for vehicle parking navigation and communication.

FIG. 3 illustrates an example of a system for vehicle parking and navigation including short range communication and long range communication. The system includes a cellular base station 131 for long range communication between vehicles equipped with a cellular modem and the server 125. Vehicles 124A and 124B may communicate with the cellular base station 131. The vehicles 124A and 124B may exchange dynamic data with the server 125 via the cellular base station 131. The dynamic data may include real time map data, venue map data and dynamic parking data. The real time map data may include map data for a geographic region including the vehicle, the parking facility or both the vehicle and the parking facility. The venue map data includes the navigable paths of the parking facility and the designated parking areas in the parking facility. The venue map may include elevators or ramps to transport vehicles from one level of the parking facility to another level of the parking facility. The dynamic parking data may include attributes of the designated parking areas. One attribute may of the designated parking areas may indicate whether or not a parking space is occupied or unoccupied. One attribute may of the designated parking areas may indicate the size of the parking space. The size of the parking space may include a width, depth, and clearance or height. One attribute may of the designated parking areas may indicate parking space identifiers (e.g., an alphanumeric code for the parking space).

An example parking facility 130 may include the parking server 125 and a DSRC gateway 133, e.g. a road side unit or parking facility unit having a transceiver. The example parking facility 130 may include an exit 137 through which vehicles exit the parking facility 130 and an entrance 135 through which vehicles enter the parking facility 130. The exit 37 and the entrance 135 may be associated with the same or different road segments.

The DSRC gateway 133 broadcasts the information to all the vehicles that are within a range of distance inside or near the parking facility. In this embodiment, a vehicle 124C may not be equipped with a cellular modem. However, the vehicle 124C may be equipped with an onboard unit (OBU) or DSRC receiver. Therefore, vehicle 124C can integrate dynamic parking data from DRSC and integrate such data with offline map cached in the vehicle.

In this embodiment, a dual mode DSRC-cellular dynamic parking delivery architecture provides a dynamic parking data may be integrated with a venue map data. The dynamic parking data may be received through the short range communication module 105. The venue map data may be received through the long range communication module 103.

The parking message module 107 may merge the first parking data received by the first communication link and the second parking data received over the second communication link into a parking message. The dynamic parking data can be displayed separately, for example, as an image, or a text which might not be integrated with the map data. The merged parking message may include data from both the short range communication module 105 and the long range communication module 103. The parking message may be included in a venue map, a three dimensional rendering of a parking area, a text message, or any combination of these sets of information.

The parking message module 107 may merge the first parking data received by the first communication link and the second parking data received over the second communication link by generating a parking map from the first parking data and generating at least one dynamic parking availability indicator from the second parking data. The parking message module 107 may provide the parking map depicting the at least one dynamic parking availability indicator. For example, available parking spaces may be highlighted on the parking map.

The parking message module 107 may merge the first parking data received by the first communication link and the second parking data received over the second communication link by rendering a three-dimensional rendering of a parking area from the first parking data. The three-dimensional rendering may be based on a building map for the parking facility including a building footprint and one or more height values.

The navigation module 109 may calculate a route in response to a routing request. In some implementations, the routing request is received at the server 125 from the mobile device 122. In some implementations, the routing request is received at the mobile device 122 from a user input. The routing request may specify a point of interest or geographic location. In response to the point of interest or destination, the parking request is generated including a parking facility identifier for an associated parking facility. The navigation module 109 may calculate a route in response to the routing request and the route includes the parking facility as a destination.

The navigation module 109 may generate additional routing based on the parking data. The route to the parking facility may include turn-by-turn directions for entering the parking facility, for example, via entrance 135. In addition, the route to the parking facility may include turn-by-turn directions within the parking facility. The directions may direct the vehicle to an available parking space as determined from the dynamic parking data.

Figure 4:
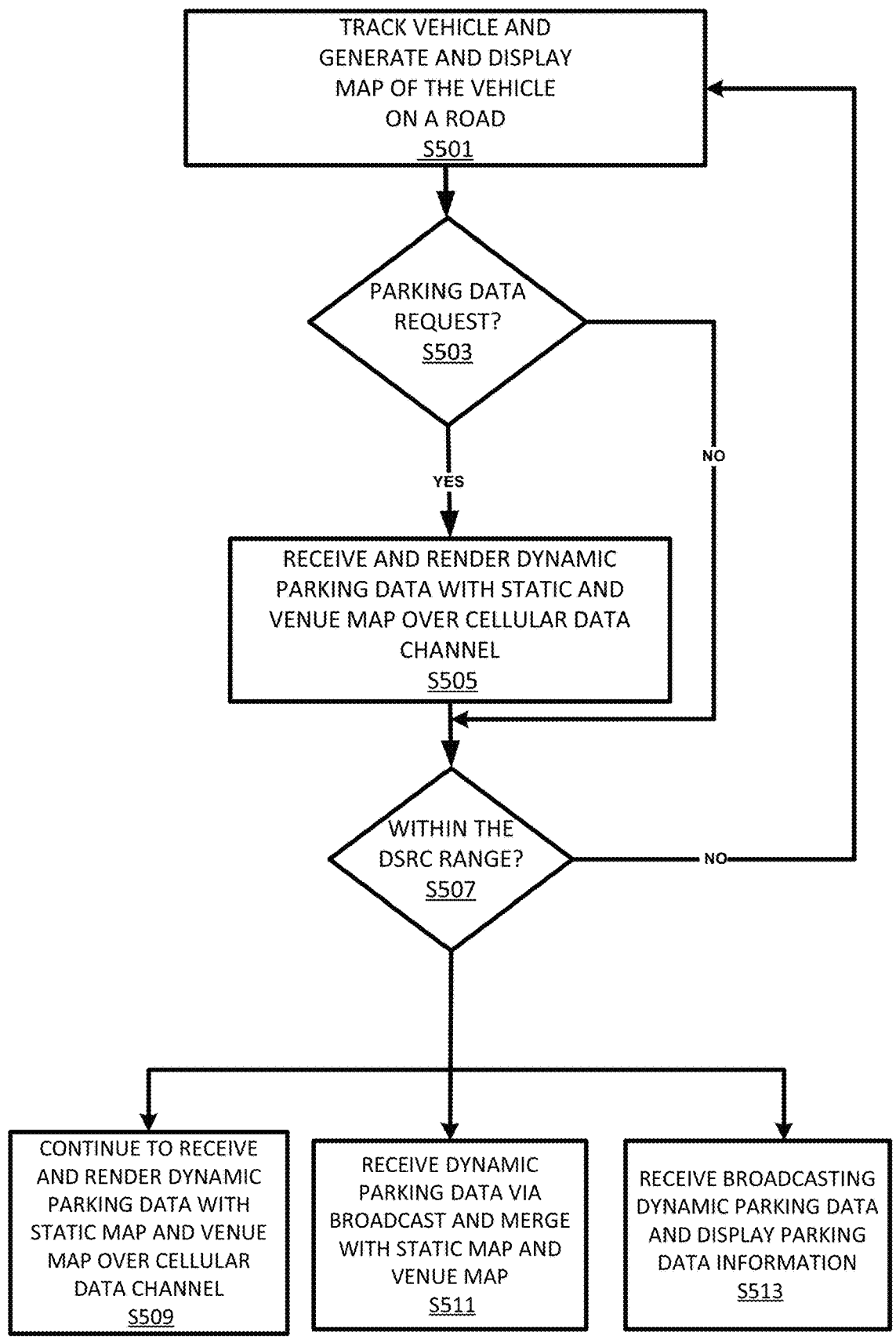
FIG. 4 illustrates a first example flow chart for dual mode dynamic parking data delivery and integration.

FIG. 4 depicts a flow diagram of procedures implemented by the vehicle navigation and communication system shown in FIG. 3 according to one example. In this embodiment, a server 125 downloads parking data 129 from the database 123. The parking data 129 is processed and delivered by the server 125 to other backend cloud servers. The server 125 may also broadcast the parking data 129 using DSRC technology. The parking data 129 may include whether the parking lot is full or whether there are spots available. The parking data 129 may further include whether a specific parking spot is available or occupied. The parking data 129 may also include map data, venue indoor map data or dynamic map data. Vehicles 124A and 124B may be equipped with at least two receivers: a cellular modem to access the cellular network and a DSRC gateway or receiver to communicate via DSRC technology.

In act S501, the controller 121 access the location data of the vehicle and tracks the vehicle 124A or 124B. The controller 121 generates and generates data for displaying a road map of the vehicle 124A or 124B based on the parking data 129. The parking data 129 may further include the number of parking space available or a dynamic image of the parking venue map indicating which parking space(s) is available. In act S503, the controller 121 determines whether the parking data has been requested by the vehicle 124A or 124B. If the parking data has been requested, in act S505, the system renders the static parking data and the venue map over the cellular data channel to the vehicle 124A or 124B. In act S507, the controller 121 determines whether the vehicle 124A or 124B is within the DSRC range. If the vehicle 124 is not within the DSRC range, the controller 121 continues to track and display the vehicle 124A or 124B on the road map.

Acts S509, S511, and S513 illustrate three scenarios in which parking data is sent from the server 125 to the vehicles depending on the communication capabilities of the vehicles. The communication capabilities of the vehicles may depend on the hardware available at the vehicles and/or may depend on the geographic locations of the vehicles. If the vehicle 124A or 124B is within the DSRC range, in act S509, the controller 121 may continue to receive and render the dynamic parking data with a static venue map over the cellular data channel. In act S511, the vehicle 124A or 124B receives the dynamic parking data via broadcast and merges the dynamic parking data with the static venue map. The vehicle receiving the data may generate a parking message including a parking facility identifier from the first parking data and at least one dynamic parking availability indicator from the second parking data. In act S513, the vehicle 124A or 124B receives the dynamic parking data and displays the parking data information in an image or via text.

The parking venue selector 102 may modify the geographic database 123 in response to the parking data. A parking map data structure may be rendered based on the first parking data. The geographic database 123 may be divided into data layers, including at least one layer designated for parking data. The parking data layer including the parking map data structure is edited in response to the second parking data.

Figure 5:
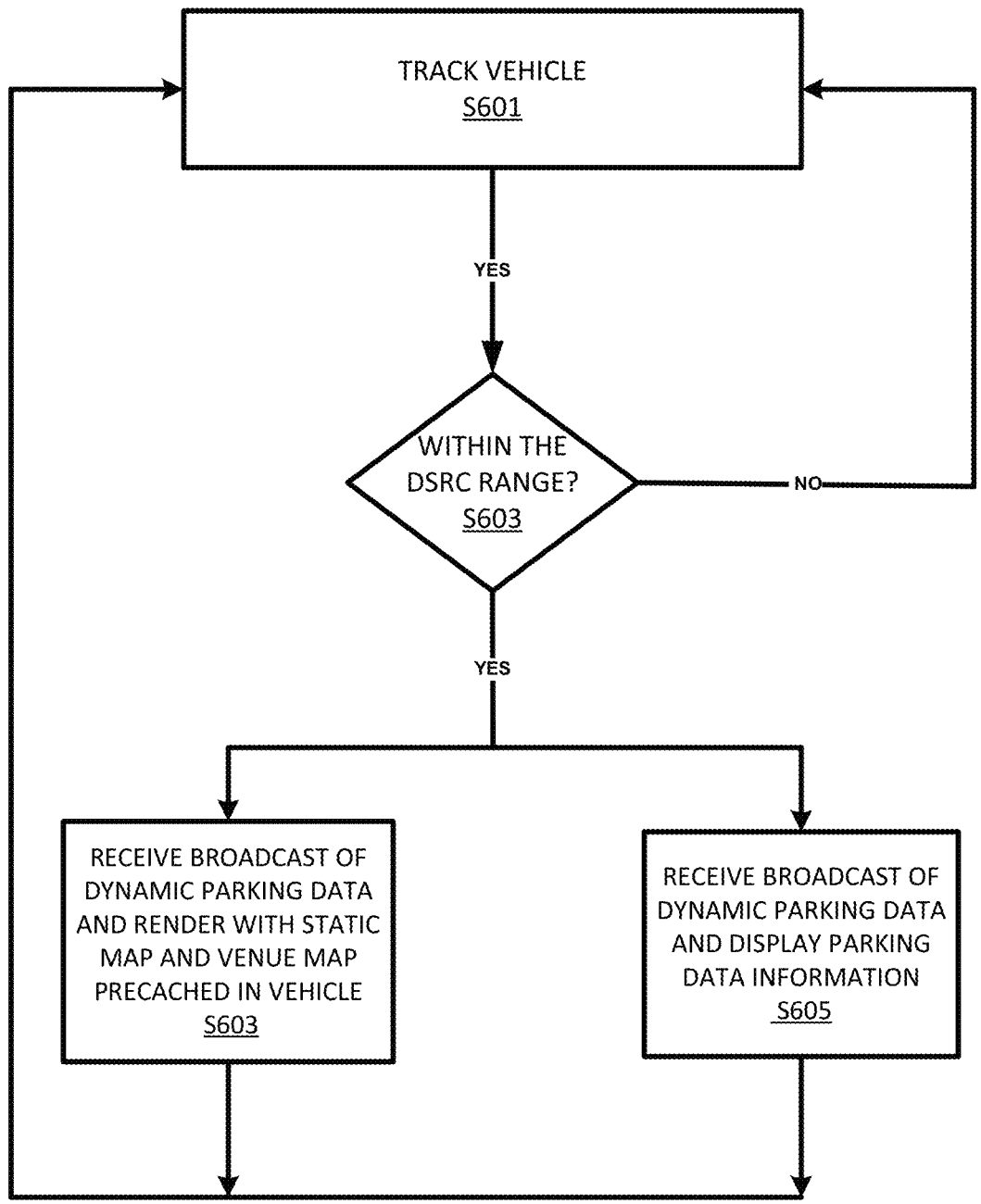
FIG. 5 illustrates a second example flow chart for dual mode dynamic parking data delivery and integration.

FIG. 5 depicts a flow diagram of procedures implemented by the vehicle navigation and communication system shown in FIG. 3 according to one example. In this example, vehicle 124C has a DSRC receiver or gateway but does not have a cellular modem. In act S601, the controller 121 tracks the vehicle 124C. In act S603, the controller 121 determines whether the vehicle 124C is within the DSRC range. If the vehicle 124C is not within the DSRC range, the controller 121 continues to track the vehicle 124C in act S601. If the vehicle 124C is within the DSRC range, the controller 121 receives the dynamic parking data via the DSRC gateway broadcast. The controller 121 merges the dynamic parking data with the static venue map precached in the vehicle 124C. In act S605, the controller 121 receives the dynamic parking data via the DSRC gateway broadcast and displays the parking data 129.

Figure 6:
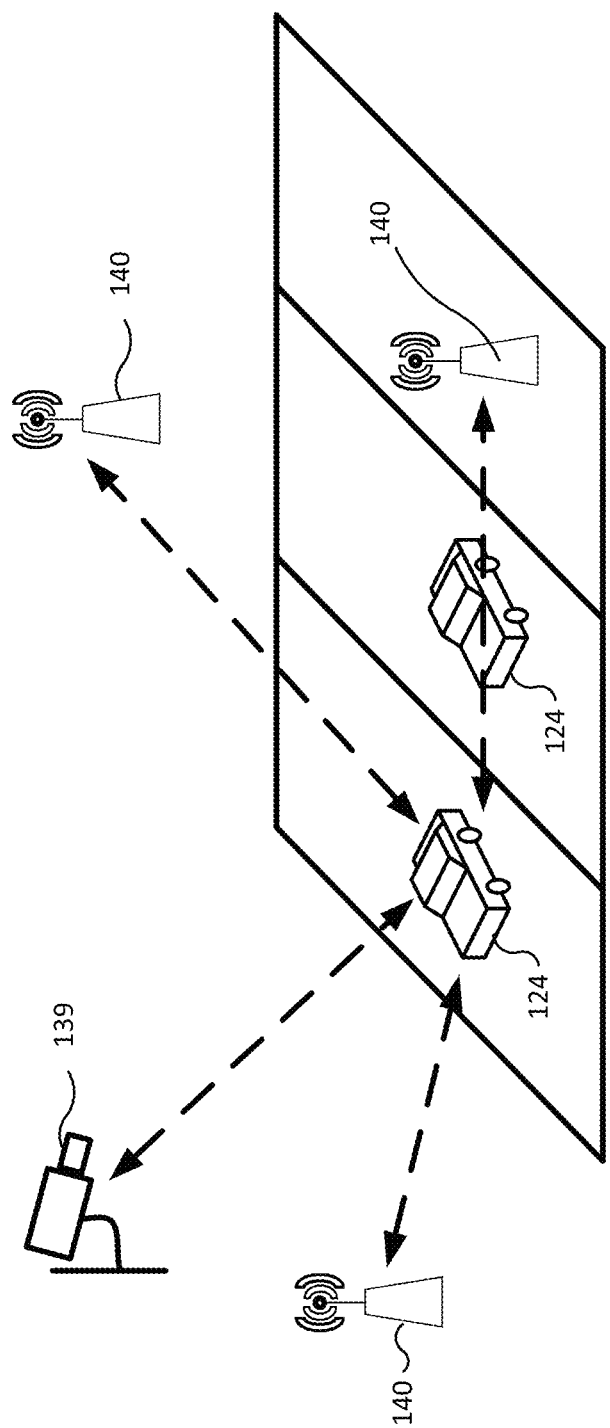
FIG. 6 illustrates an example indoor positioning system.

FIG. 6 illustrates a system for vehicle parking and navigation according to one example. In this example, the system includes different technologies to locate the position of a vehicle 124. The system may include a video camera 139 and one or more WiFi beacon point(s) 140. The system is may include other technologies or sensor technologies such as Bluetooth or positioning based on magnetics field to identify whether a parking space is available or occupied by a vehicle.

For example, the parking server 125 may receive sensor data indicative of one or more parked vehicles, or absence of one or more parked vehicles. The sensor data may be based on radio signals. The sensor data may include radio signals that are impacted by the presence of a parked vehicle at certain location. The parking server 125 is configured to compare the received radio signal to one or more fingerprints to determine whether vehicles are parked in specific locations.

The sensor data may include image data. The parking server 125 is configured to analyze images from the image data using computer vision, edge detection, neural networks, or other models to determine whether vehicles are parked in certain locations. The sensor data may include distance data such as LiDAR, RADAR, SONAR, or infrared beam sensing that detects the presence of vehicles parked in certain location. The sensor data may include presence data that detects the physical presence of the vehicles. For example, an inductive loop buried in the floor under the parking space may detect the presence of a vehicle. In addition, weight sensors under the parking space may detect the presence of the vehicle. Alternatively, as discussed below the vehicle in the parking space may detect that the vehicle is occupied, for example, by scanning indicia on the parking space or detecting the location of the vehicle.

Figure 7:
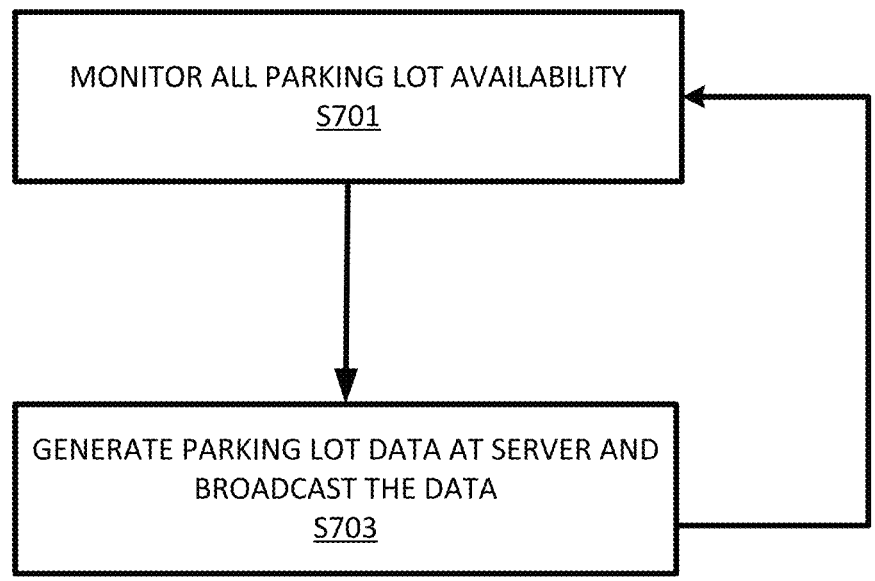
FIG. 7 illustrates an example flow chart for parking data preparation and delivery.

FIG. 7 illustrates a flow chart for generating dynamic parking data by the parking server 125. Using one or more of the indoor positioning techniques, the parking server monitors the parking lot availability at act S701. For example, using any of these indoor positioning techniques, the parking server 125 analyzes the sensor data to generate the parking data that includes the dynamic parking availability indicator.

At act S703, the parking server 125 generates dynamic parking lot data and broadcasts the data through short range communication. The parking server 125 may convert the detection of a vehicle in the sensor data to parking availability indicator that is associated with a venue map using a parking space code. Thus, the parking server 125 may generate an availability table including pairs of parking space codes and parking space availability indicators. The parking server 125 may send the availability table to one or more requesting vehicles. The parking server 125 may receive a parking request from the vehicle, and in response to the request, check communication availability for the vehicle. If possible, the parking server 125 sends the parking availability table to the vehicle using the short range communication link.

Figure 8:
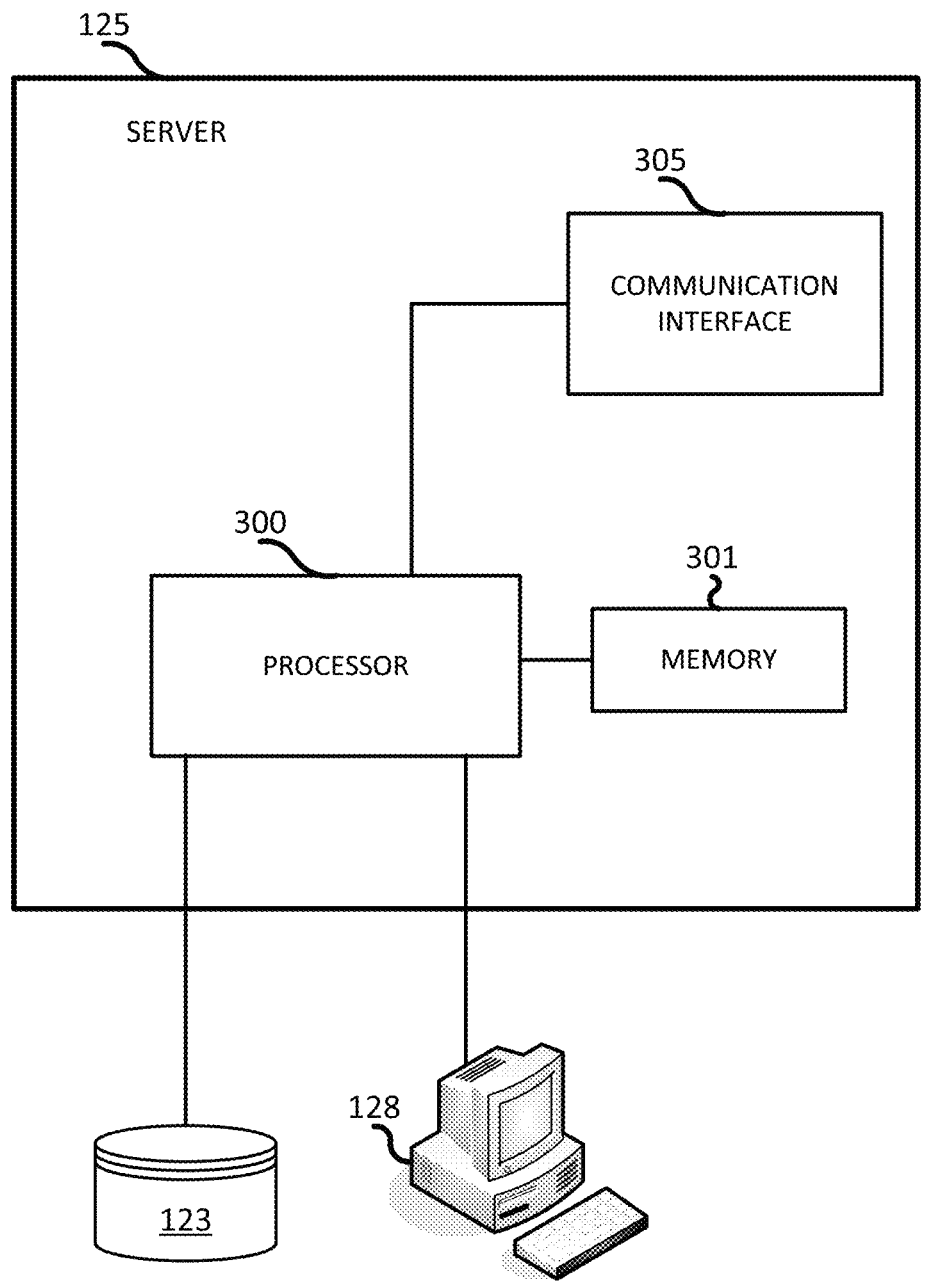
FIG. 8 illustrates an example server for the system for vehicle parking navigation and communication.

FIG. 8 illustrates an example server for the system of FIG. 1. The server 125 includes a processor 300, a communication interface 305, a memory 301, and a database 123. An input device (e.g., keyboard or personal computer 128) may be used to enter settings to the server 125. The settings may include settings for thresholds and other user preferences described herein. Additional, different, or fewer components may be provided in the server 125.

Figure 9:
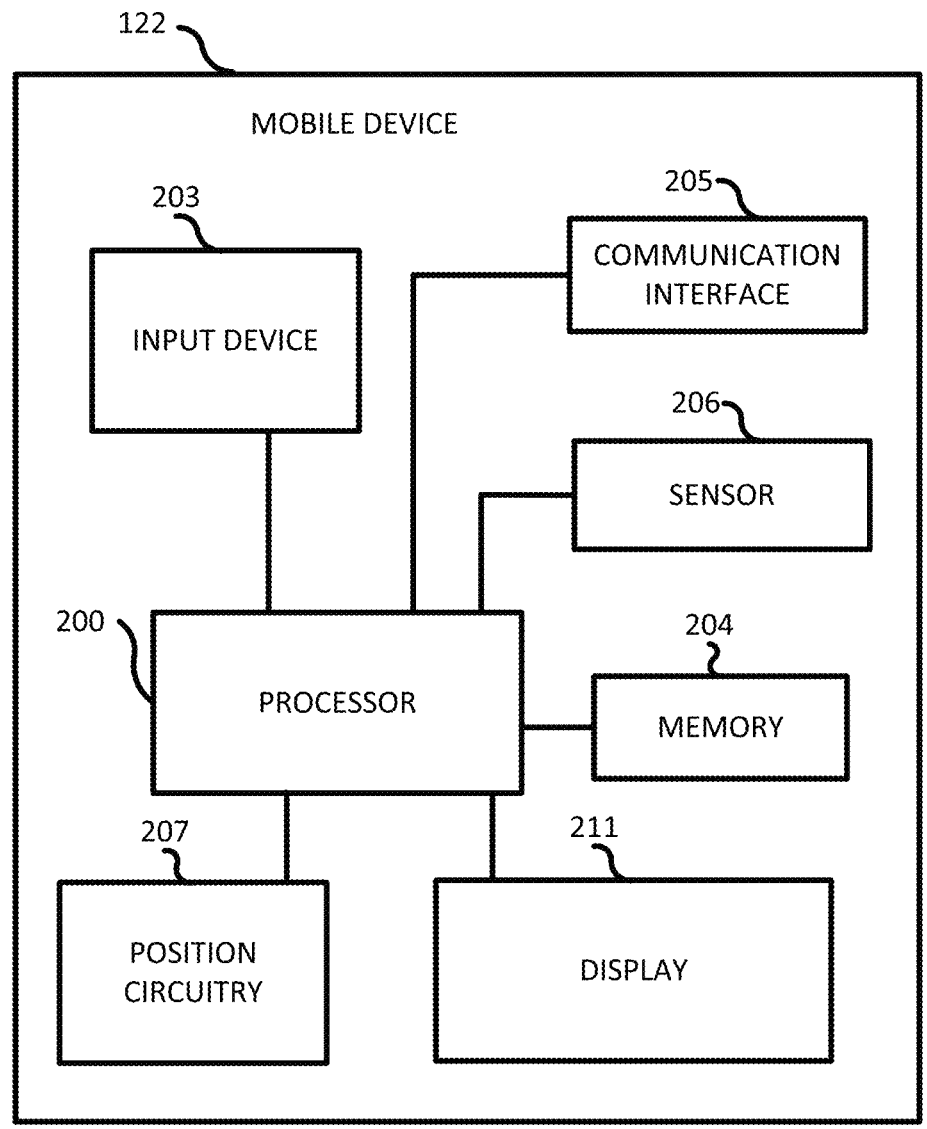
FIG. 9 illustrates an example mobile device for the system for vehicle parking navigation and communication.

FIG. 9 illustrates an example of a mobile device 122 of the system of FIG. 1. The mobile device 122 includes a processor 200, a memory 204, an input device 203, a communication interface 205, position circuitry 207, a display 211, and a sensor 206. The sensor 206 may include one or more of the sensors described with respect to FIG. 12. The input device 203 may receive commands from the user for default settings such as the type of communication. The type of communication may specify whether long range or short communication is used for venue maps, dynamic parking data, and additional information. The default settings may further include the desired price to pay for a parking spot and the desired proximity of the parking spot to the point of interest, to an elevator, or to an exit. Other default settings may include but are not limited to the type of vehicle and the desired type of parking spot. Types of parking spots may include handicap, electric car, small car or regular-sized parking spot. The input device 203 may receive commands from the user including navigation requests including a desired point of interest or a selected parking facility.

The sensor 206 may be configured to detect the location of the vehicle for reporting the location to the parking server 125. The sensor 206 may read indicia (e.g., barcode or QR code) printed on the surface of the parking space. The sensor 206 may detect the surrounding of the vehicle for localization. The sensor 206 may include a camera, a LiDAR device, or another sensor described herein. Additional, different, or fewer components are possible for the mobile device 122.

Figure 10:
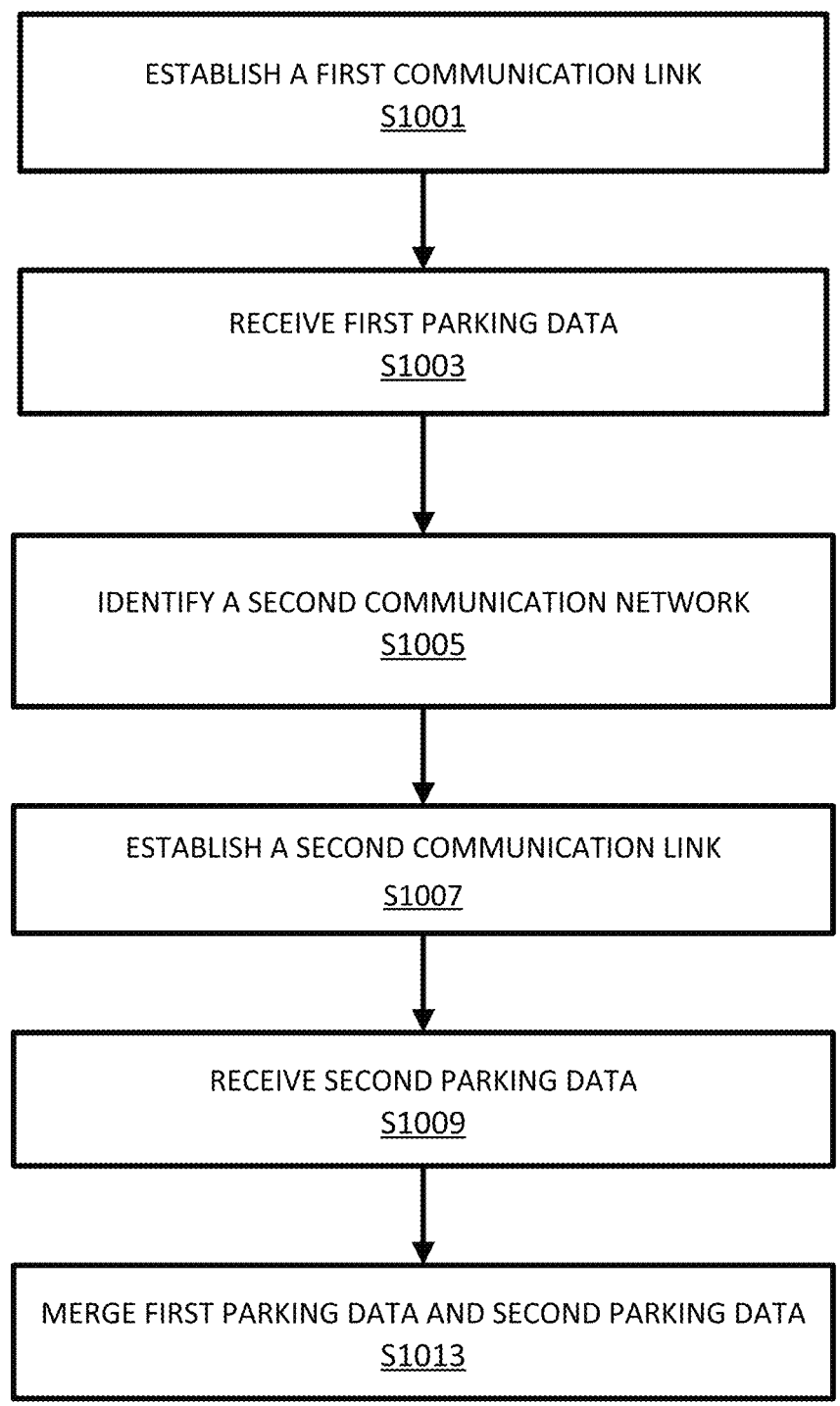
FIG. 10 illustrates an example flow chart for the operations of the server and/or the mobile device.

FIG. 10 illustrates an example flow chart for the operations of the mobile device 122. Additional, different, or fewer acts may be provided.

In this embodiment, a user may visit a point of interest with an associated parking facility, e.g., a shopping mall or a museum, from a start point, e.g., a home or place of work. The display 211 of the mobile device 122 may be activated in response to an action by the user. The input device 203 allows the user to interact with the user-interactive representation shown in the display 211 to enter commands for the settings or for the routing request. Once entered, the setting information and the routing request is stored in the memory 204. The memory 204 also contains precached parking facility information.

At act S1001, the communication interface 205, establishes link in a first communication network between the mobile device 122 and the communication interface 305 of the server 125. The first communication network may be a cellular base station using cellular network technology that connected the server 125 and the mobile device 122. The link may exchange information between the mobile device 122 and the server 125 for routing the mobile device according to the location detected by the sensor 206 or the position circuitry 207.

In one example, the processor 200 determines whether the mobile device 122 is located out of range from a parking facility communication network by using the location detected by the sensor 206 or the position circuitry 207. The location may be compared to a coverage area for the parking facility communication network. If the mobile device 122 is out of range, at act S1001, the communication interface 205, establishes link in a first communication network between the mobile device 122 and the server 125.

The processor 200 sends the settings data to the server 125. The server 125 receives the settings data over the first communication link. The server 125 queries the database 123 for a list of nearby parking facilities that match the settings, which may be stored in memory 301 temporarily. The server 125 sends the list of one or more nearby parking facilities stored in memory 301. The server 125 may send a map and/or navigation information via the first communication link.

At act S1003, the processor 200 receives the list of nearby parking facilities, dynamic geographic map and navigation information from the server 125 over the first communication link. The input device 203 receives an input from the user selecting a parking facility. The parking facility selection includes a parking facility identifier. The parking request is then stored in the memory 204. The display 211 may render one or more map layers including the geographical map. Another map layer may be displayed including the point-of-interest information. The processor 200 may generate a parking map from the first parking data obtained via the first communication link.

The processor 200 continues to determine whether the mobile device 122 is located out of range from a parking facility by using the location detected by the position circuitry 207 or the sensor 206. If the mobile device 122 is within range of the selected parking facility, at act S1005, the communication interface 205 identifies a second communication network at least in part in response to the parking facility identifier.

At act S1009, the communication interface 125 establishes a second communication link within the second communication network between the mobile device 122 and the parking server 125. The server 125 may broadcast a second parking data including dynamic parking availability data via the second communication link. The second parking data may contain information such as the number of available parking spaces and available parking spaces. At act S1011, the processor 200 may receive the second parking data over the second communication link. The memory 204 may already have stored information containing a static parking map and directions on how to arrive to each parking space.

The first parking data or the second parking data may include an availability indicator for a parking area. The availability indicator may be a number, a green light, a flag, or a symbol displayed in the static parking map.

The processor 200 may further generate at least one dynamic parking availability indicator using the second parking data obtained via the second communication link. The processor 200 may further provide the parking map depicting the at least one dynamic parking availability indicator.

The processor 200 may generate and display a three-dimensional rendering of a parking area from the first parking data in the display 211. Once a parking space has been selected by the user, or using the settings, the processor 200 may determine a destination from the second parking data. The processor 200 may calculate a route to the destination parking space in response to the parking request.

Figure 11:
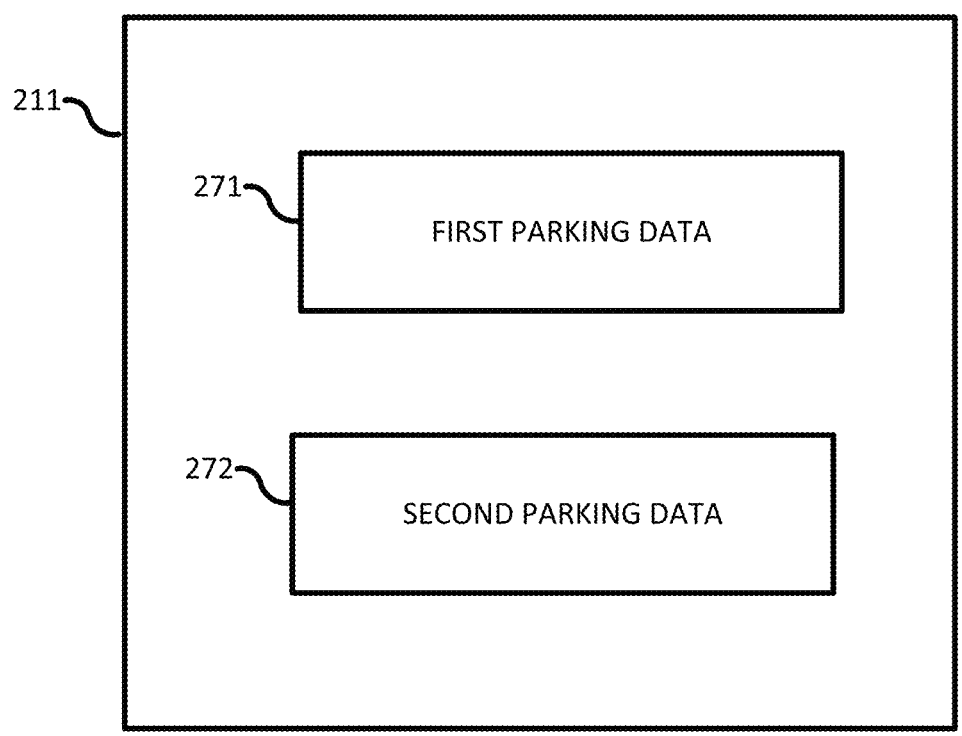
FIG. 11 illustrates an example display of merged first parking data and second parking data.

At act S1013, the processor 200 may merge the first parking data and second parking data. Once the first and second parking data are merged, the display 211 may seamlessly show another integrated map layer including the second parking data. FIG. 11 illustrates an example of display 211 including the merged first parking data 271 and second parking data 272. The first parking data 271 may include a venue map or a rendering of a parking facility. The second parking data 272 may include availability information (e.g., a number of available spaces, a location of one or more spaces, or an indication of whether or not one or more spaces are available). The availability may be determined by the indoor positioning techniques operated by the server 125.

Figure 12:
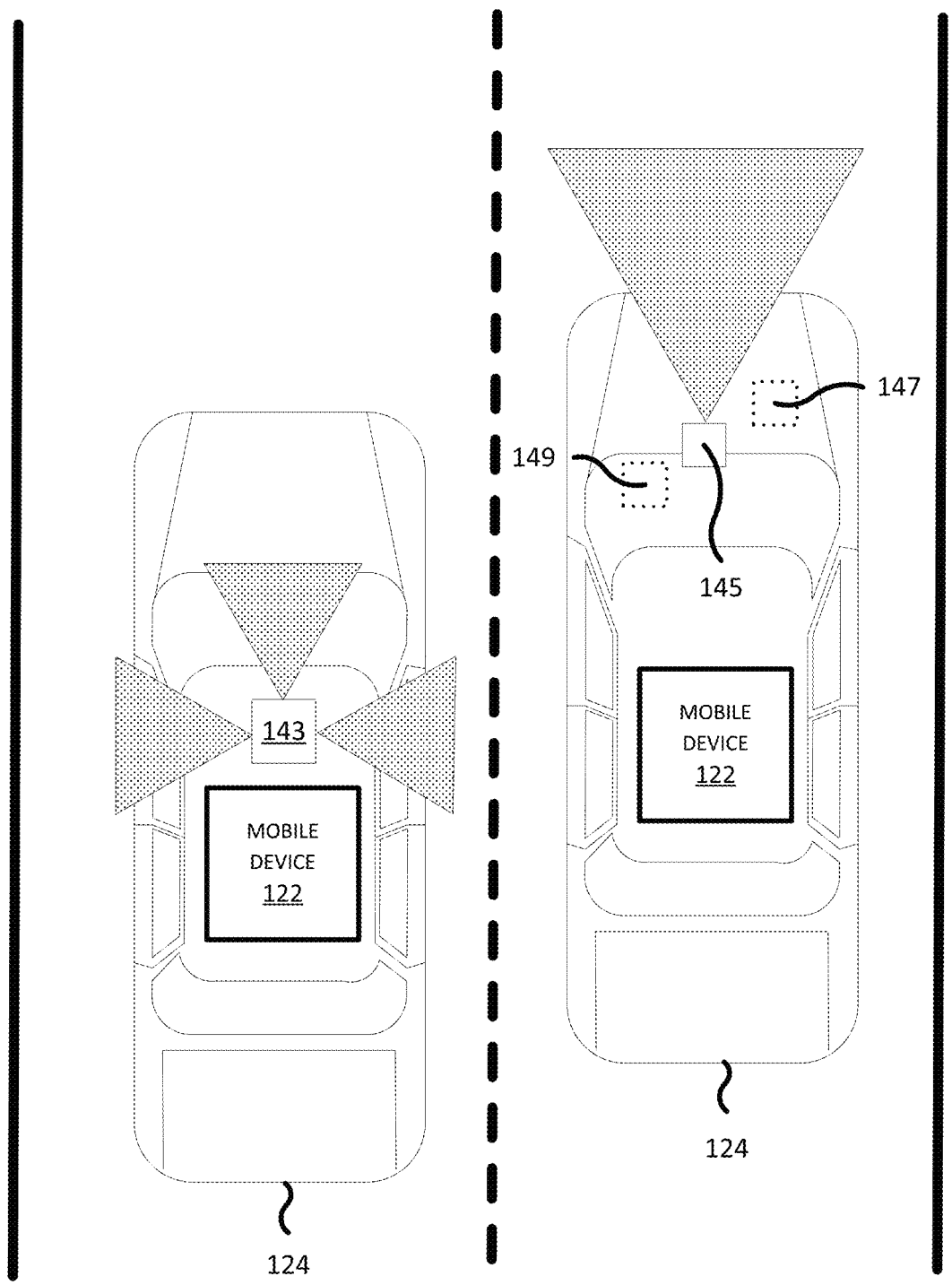
FIG. 12 illustrates an example of vehicles of the systems of FIG. 1.

FIG. 12 illustrates an exemplary vehicle 124 of the system of FIG. 1. The vehicles 124 may include a variety of devices such as a global positioning system, a dead reckoning-type system, cellular location system, or combinations of these or other systems, which may be referred to as position circuitry or a position detector. The positioning circuitry may include suitable sensing devices that measure the traveling distance, speed, direction, and so on, of the vehicle 124. The positioning system may also include a receiver and correlation chip to obtain a GPS or GNSS signal. Alternatively or additionally, the one or more detectors or sensors may include an accelerometer built or embedded into or within the interior of the vehicle 124. The vehicle 124 may include one or more distance data detection device or sensor, such as a light detection and ranging (LiDAR) device. The distance data detection sensor may generate point cloud data. The distance data detection sensor may include a laser range finder that rotates a mirror directing a laser to the surroundings or vicinity of the collection vehicle on a roadway or another collection device on any type of pathway.

A connected vehicle includes a communication device and an environment sensor array for reporting the surroundings of the vehicle 124 to the server 125. The connected vehicle may include an integrated communication device coupled with an in-dash navigation system. The connected vehicle may include an ad-hoc communication device such as a mobile device 122 or smartphone in communication with a vehicle system. The communication device connects the vehicle to a network including at least one other vehicle and at least one server. The network may be the Internet or connected to the internet.

The sensor array may include one or more sensors configured to detect surroundings of the vehicle 124. The sensor array may include multiple sensors. Example sensors include an optical distance system such as LiDAR 143, an image capture system 145 such as a camera, a sound distance system such as sound navigation and ranging (SONAR), a radio distancing system such as radio detection and ranging (RADAR) or another sensor. The camera may be a visible spectrum camera, an infrared camera, an ultraviolet camera or another camera.

In some alternatives, additional sensors may be included in the vehicle 124. An engine sensor 147 may include a throttle sensor that measures a position of a throttle of the engine or a position of an accelerator pedal, a brake sensor that measures a position of a braking mechanism or a brake pedal, or a speed sensor that measures a speed of the engine or a speed of the vehicle wheels. Another additional example, vehicle sensor 149, may include a steering wheel angle sensor, a speedometer sensor, or a tachometer sensor.

A mobile device 122 may be integrated in the vehicle 124, which may include assisted driving vehicles such as autonomous vehicles, highly assisted driving (HAD), and advanced driving assistance systems (ADAS). Any of these assisted driving systems may be incorporated into mobile device 122. Alternatively, an assisted driving device may be included in the vehicle 124. The assisted driving device may include memory, a processor, and systems to communicate with the mobile device 122. The assisted driving vehicles may respond to the selected parking facility location and parking availability locations with the parking facility and other geographic data received from geographic database 123 and the server 125 to generate driving commands or navigation commands to drive the vehicle to an available parking space in response to the parking request.

The routing instructions may be provided by display 211. The mobile device 122 may be configured to execute routing algorithms to determine an optimum route to travel along a road network from an origin location to a destination location in a geographic region. Using input(s) including map matching values from the server 125, a mobile device 122 examines potential routes between the origin location and the destination location to determine the optimum route. The mobile device 122, which may be referred to as a navigation device, may then provide the end user with information about the optimum route in the form of guidance that identifies the maneuvers required to be taken by the end user to travel from the origin to the destination location. Some mobile devices 122 show detailed maps on displays outlining the route, the types of maneuvers to be taken at various locations along the route, locations of certain types of features, and so on. Possible routes may be calculated based on a Dijkstra method, an A-star algorithm or search, and/or other route exploration or calculation algorithms that may be modified to take into consideration assigned cost values of the underlying road segments.

The mobile device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

The geometric features may include curvature, slope, or other features. The curvature of a road segment describes a radius of a circle that in part would have the same path as the road segment. The slope of a road segment describes the difference between the starting elevation and ending elevation of the road segment. The slope of the road segment may be described as the rise over the run or as an angle.

The restrictions for traveling the roads or intersections may include turn restrictions, travel direction restrictions, speed limits, lane travel restrictions or other restrictions. Turn restrictions define when a road segment may be traversed onto another adjacent road segment. For example, when a node includes a "no left turn" restriction, vehicles are prohibited from turning left from one road segment to an adjacent road segment. Turn restrictions may also restrict that travel from a particular lane through a node. For example, a left turn lane may be designated so that only left turns (and not traveling straight or turning right) is permitted from the left turn late. Another example of a turn restriction is a "no U-turn" restriction.

Travel direction restriction designate the direction of travel on a road segment or a lane of the road segment. The travel direction restriction may designate a cardinal direction (e.g., north, southwest, etc.) or may designate a direction from one node to another node. The roadway features may include the number of lanes, the width of the lanes, the functional classification of the road, or other features that describe the road represented by the road segment. The functional classifications of roads may include different levels accessibility and speed. An arterial road has low accessibility but is the fastest mode of travel between two points. Arterial roads are typically used for long distance travel. Collector roads connect arterial roads to local roads. Collector roads are more accessible and slower than arterial roads. Local roads are accessible to individual homes and business. Local roads are the most accessible and slowest type of road.

The databases may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

Figure 13:
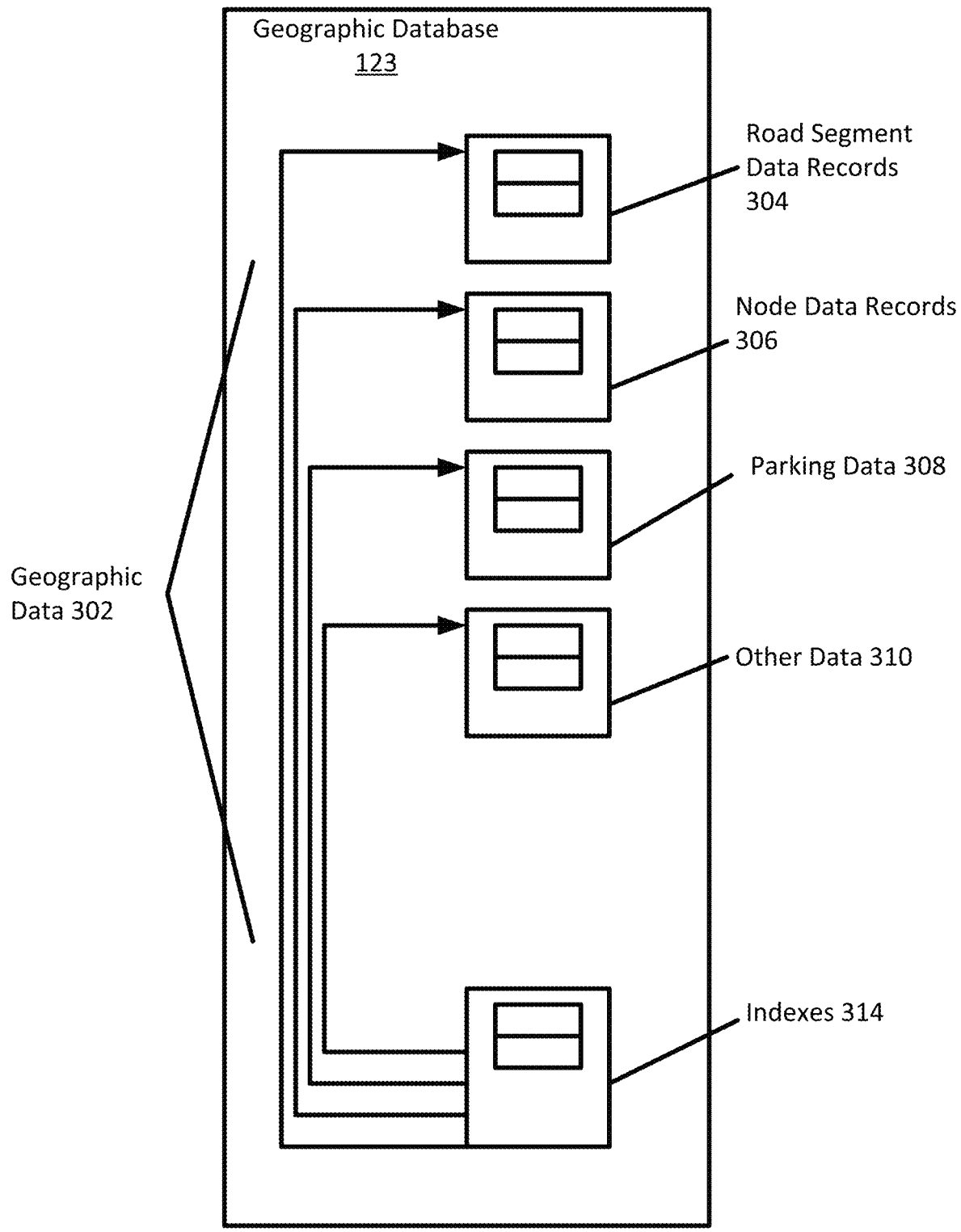
FIG. 13 illustrates an example geographic database.

In FIG. 13, the geographic database 123 may contain at least one road segment database record 304 (also referred to as "entity" or "entry") for each road segment in a particular geographic region. The geographic database 123 may also include a node database record 306 (or "entity" or "entry") for each node in a particular geographic region. The terms "nodes" and "segments" represent only one terminology for describing these physical geographic features, and other terminology for describing these features is intended to be encompassed within the scope of these concepts. The geographic database 123 may also include location fingerprint data for specific locations in a particular geographic region.

The geographic database 123 may include other kinds of data 310. The other kinds of data 310 may represent other kinds of geographic features or anything else. The other kinds of data may include POI data. For example, the POI data may include POI records comprising a type (e.g., the type of POI, such as restaurant, hotel, city hall, police station, historical marker, ATM, golf course, etc.), location of the POI, a phone number, hours of operation, etc.

The geographic database 123 also includes indexes 314. The indexes 314 may include various types of indexes that relate the different types of data to each other or that relate to other aspects of the data contained in the geographic database 123. For example, the indexes 314 may relate the nodes in the node data records 306 with the end points of a road segment in the road segment data records 304.

As another example, the indexes 314 may relate parking data 308 with a road segment in the segment data records 304 or a geographic coordinate. An index 314 may, for example, store parking data 308 at different times in the future. The index 314 may include an array of parking data at different times. The parking data 308 may include venue maps for parking facilities and/or parking availability indicators for individual parking areas in the parking facility.

The geographic database 123 may also include other attributes of or about roads such as, for example, geographic coordinates, physical geographic features (e.g., lakes, rivers, railroads, municipalities, etc.) street names, address ranges, speed limits, turn restrictions at intersections, and/or other navigation related attributes (e.g., one or more of the road segments is part of a highway or toll way, the location of stop signs and/or stoplights along the road segments), as well as POIs, such as gasoline stations, hotels, restaurants, museums, stadiums, offices, automobile dealerships, auto repair shops, buildings, stores, parks, municipal facilities, other businesses, etc. The geographic database 123 may also contain one or more node data record(s) 306 which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data 302 may additionally or alternatively include other data records such as, for example, POI data records, topographical data records, cartographic data records, routing data, and maneuver data. Other contents of the database 123 may include temperature, altitude or elevation, lighting, sound or noise level, humidity, atmospheric pressure, wind speed, the presence of magnetic fields, electromagnetic interference, or radio- and micro-waves, cell tower and wi-fi information, such as available cell tower and wi-fi access points, and attributes pertaining to specific approaches to a specific location.

The processor 200 and/or processor 300 may include a general processor, digital signal processor, an application specific integrated circuit (ASIC), field programmable gate array (FPGA), analog circuit, digital circuit, combinations thereof, or other now known or later developed processor. The processor 200 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 801 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The databases 123 may include geographic data used for traffic and/or navigation-related applications. The geographic data may include data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may include structured cartographic data or pedestrian routes.

The input device 203 may be one or more buttons, keypad, keyboard, mouse, stylus pen, trackball, rocker switch, touch pad, voice recognition circuit, or other device or component for inputting data to the mobile device 122. The input device 203 and display 211 may be combined as a touch screen, which may be capacitive or resistive. The display 211 may be a liquid crystal display (LCD) panel, light emitting diode (LED) screen, thin film transistor screen, or another type of display. The output interface of the display 211 may also include audio capabilities, or speakers. In an embodiment, the input device 203 may involve a device having velocity detecting abilities.

The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The position circuitry 207 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a vehicle may be considered a mobile device, or the mobile device may be integrated into a vehicle.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The following example embodiments of the invention are also disclosed:

Embodiment 1

A method for vehicle parking navigation and communication, the method further comprising:
   negotiating a first communication link between a mobile device and a parking server;
   receiving first parking data over the first communication link;
   receiving a parking request including a parking facility identifier;
   identifying a short range communication network at least in part in response to the parking facility identifier;
   negotiating a second communication link between the mobile device and the parking server, wherein the short range communication network includes the second communication link;
   receiving second parking data over the second communication link; and
   merging the first parking data and second parking data.

Embodiment 2

The method of embodiment 1, wherein the first parking data or the second parking data includes an availability indicator for a parking area.

Embodiment 3

The method of embodiment 1 or 2, wherein merging the first parking data and second parking data further comprises:
   generating a parking map from the first parking data;
   generating at least one dynamic parking availability indicator from the first parking data or the second parking data; and
   providing the parking map depicting the at least one dynamic parking availability indicator.

Embodiment 4

The method of any of embodiments 1 to 3, wherein merging the first parking data and second parking data further comprises:
   generating a three dimensional rendering of a parking area from the first parking data;
   determining a destination; and
   calculating a route to the destination in response to the parking request.

Embodiment 5

The method of any of embodiments 1 to 4, wherein merging the first parking data and second parking data further comprises:
   generating a parking message including a parking facility identifier from the first parking data and at least one dynamic parking availability indicator from the second parking data.

Embodiment 6

The method of any of embodiments 1 to 5, wherein merging the first parking data and second parking data further comprises:
   generating a parking map data structure based on the first parking data and the second parking data.

Embodiment 7

The method of any of embodiments 1 to 6, further comprising:
   receiving position data from a mobile device, wherein the short range communication network is identified at least in part in response to the position data.

Embodiment 8

The method of any of embodiments 1 to 7, further comprising:
   performing a comparison between the position data and the parking request; and
   determining whether to negotiate the second communication link in response to the comparison.

Embodiment 9

The method of any of embodiments 1 to 8, wherein the second parking data includes at least one dynamic parking availability indicator derived from an indoor positioning technique.

Embodiment 10

The method of any of embodiments 1 to 9, wherein the indoor positioning technique includes radio map positioning, image processing of camera images, beacon positioning, inductive vehicle positioning, or infrared positioning.

Embodiment 11

The method of any of embodiments 1 to 10, further comprising:
   querying a parking facility table with the parking facility identifier;
   identifying a target network identifier for the short range communication network from the parking facility table.

Embodiment 12

The method of any of embodiments 1 to 11, further comprising:
   receiving a communication signal from the short range communication network;
   identifying a broadcasted network identifier from the communication signal; and
   performing a comparison of the target network identifier to the broadcasted network identifier.

Embodiment 13

The method of any of embodiments 1 to 12, further comprising:
   receiving a navigation request including a point of interest, wherein the point of interest is indicative of the parking request.

Embodiment 14

The method of any of embodiments 1 to 13, further comprising:
receiving a user input including the parking request including the parking facility identifier.

Embodiment 15

The method of any of embodiments 1 to 14, wherein the first communication link and the second communication link are created in response to the parking request.

Embodiment 16

The method of any of embodiments 1 to 15, further comprising:
calculating a route in response to the first parking data and the second parking data.

Embodiment 17

An apparatus, configured to perform and/or control the method of any of embodiments 1-16 or comprising means for performing and/or controlling any of embodiments 1-16.

Embodiment 18

An apparatus, comprising at least one processor and at least one memory including computer program code for one or more programs, the at least one memory and the computer program code configured to, with the at least one processor, to perform and/or control the method of any of embodiments 1-16.

Embodiment 19

A computer program comprising instructions operable to cause a processor to perform and/or control the method of any of embodiments 1-16, when the computer program is executed on the processor.

We claim:

1. A method for vehicle parking navigation and communication, the method further comprising:
negotiating a first communication link between a mobile device and a parking server;
generating a parking map of a parking facility from first parking data received over the first communication link;
receiving a parking request including a parking facility identifier;
identifying a short range communication network at least in part in response to the parking facility identifier;
negotiating a second communication link between the mobile device and the parking server, wherein the short range communication network includes the second communication link;
receiving second parking data over the second communication link; and
merging the parking map from the first parking data with dynamic indicators from the second parking data.

2. The method of claim 1, wherein the first parking data or the second parking data includes an availability indicator for a parking area.

3. A method for vehicle parking navigation and communication, the method further comprising:
negotiating a first communication link between a mobile device and a parking server;
receiving first parking data over the first communication link;
receiving a parking request including a parking facility identifier;
identifying a short range communication network at least in part in response to the parking facility identifier;
negotiating a second communication link between the mobile device and the parking server, wherein the short range communication network includes the second communication link;
receiving second parking data over the second communication link, and merging the first parking data and second parking data, wherein merging the first parking data and second parking data further comprises:
generating a parking map of the parking facility from the first parking data;
generating at least one dynamic parking availability indicator from the first parking data or the second parking data; and
providing the parking map depicting the at least one dynamic parking availability indicator.

4. The method of claim 1, wherein merging the first parking data and second parking data further comprises:
generating a three dimensional rendering of a parking area from the first parking data;
determining a destination; and
calculating a route to the destination in response to the parking request.

5. The method of claim 1, wherein merging the first parking data and second parking data further comprises:
generating a parking message including a parking facility identifier from the first parking data and at least one dynamic parking availability indicator from the second parking data.

6. The method of claim 1, wherein merging the first parking data and second parking data further comprises:
generating a parking map data structure based on the first parking data and the second parking data.

7. The method of claim 1, further comprising:
receiving position data from a mobile device, wherein the short range communication network is identified at least in part in response to the position data.

8. The method of claim 7, further comprising:
performing a comparison between the position data and the parking request; and
determining whether to negotiate the second communication link in response to the comparison.

9. The method of claim 1, wherein the second parking data includes at least one dynamic parking availability indicator derived from an indoor positioning technique.

10. The method of claim 9, wherein the indoor positioning technique includes radio map positioning, image processing of camera images, beacon positioning, inductive vehicle positioning, or infrared positioning.

11. The method of claim 1, further comprising:
querying a parking facility table with the parking facility identifier;
identifying a target network identifier for the short range communication network from the parking facility table.

12. The method of claim 11, further comprising:
receiving a communication signal from the short range communication network;
identifying a broadcasted network identifier from the communication signal; and performing a comparison of the target network identifier to the broadcasted network identifier.

13. The method of claim 1, further comprising:
receiving a navigation request including a point of interest, wherein the point of interest is indicative of the parking request.

14. The method of claim 1, further comprising:
receiving a user input including the parking request including the parking facility identifier.

15. The method of claim 1, wherein the first communication link and the second communication link are created in response to the parking request.

16. The method of claim 1, further comprising:
calculating a route in response to the first parking data and the second parking data.

17. An apparatus for vehicle parking navigation and communication, the apparatus comprising:
a processor;
a non-transitory computer readable medium coupled with the processor, the non-transitory computer readable medium including instructions that when executed by the processor are configured to implement:
a parking venue selector to receive a parking request and determine a parking facility identifier in response to the parking request;
a long range communication module to negotiate a first communication link with a parking server and receive first parking data over the first communication link;
a short range communication module to negotiate a second communication link with the parking server in response to the parking facility identifier and receive second parking data over the second communication link; and
a parking message module to merge a parking map from the first parking data received over the first communication link and a dynamic indicator in the second parking data received over the second communication link into a parking message.

18. The apparatus of claim 17, wherein the non-transitory computer readable medium further includes instructions that when executed by the processor are configured to implement:
a navigation module to calculate a route in response to a routing request and calculate the parking request including a destination of the route.

19. The apparatus of claim 17, wherein the parking message is a venue map, a three-dimensional rendering of a parking area, or a text message.

* * * * *